(12) United States Patent
Ward (10) Patent No.: US 10,514,102 B2
(45) Date of Patent: Dec. 24, 2019

(54) INTERSHAFT BLADELET SEAL

(71) Applicant: United Technologies Corporation, Farmington, CT (US)

(72) Inventor: Eric J. Ward, West Palm Beach, FL (US)

(73) Assignee: United Technologies Corporation, Farmington, CT (US)

( * ) Notice: Subject to any disclaimer, the term of this patent is extended or adjusted under 35 U.S.C. 154(b) by 110 days.

(21) Appl. No.: 15/650,364

(22) Filed: Jul. 14, 2017

(65) Prior Publication Data

US 2019/0017604 A1    Jan. 17, 2019

(51) Int. Cl.

| | |
|---|---|
| *F01D 11/08* | (2006.01) |
| *F16J 15/3292* | (2016.01) |
| *F01D 11/00* | (2006.01) |
| *F16J 15/00* | (2006.01) |
| *F16J 15/3232* | (2016.01) |
| *F01D 5/06* | (2006.01) |
| *F02C 7/28* | (2006.01) |

(52) U.S. Cl.
CPC ......... *F16J 15/3292* (2013.01); *F01D 11/003* (2013.01); *F16J 15/002* (2013.01); *F16J 15/3232* (2013.01); *F01D 5/06* (2013.01); *F02C 7/28* (2013.01)

(58) Field of Classification Search
CPC .... F16J 15/3292; F16J 15/002; F16J 15/3232; F01D 11/003; F01D 5/06; F02C 7/28
See application file for complete search history.

(56) References Cited

U.S. PATENT DOCUMENTS

| | | | |
|---|---|---|---|
| 3,447,741 A | * | 6/1969 | Soulez-Lariviere ......................... B64C 11/001 415/173.6 |
| 5,088,889 A | | 2/1992 | Wolff |
| 9,169,849 B2 | | 10/2015 | Ward |
| 2007/0007730 A1 | | 1/2007 | Garrison et al. |
| 2010/0074734 A1 | * | 3/2010 | Little .................... F01D 11/001 415/173.7 |
| 2011/0163505 A1 | | 7/2011 | Bhagavatheeswaran et al. |

FOREIGN PATENT DOCUMENTS

| | | |
|---|---|---|
| DE | 3505491 A1 | 8/1986 |
| EP | 1734292 A1 | 12/2006 |
| JP | 3064602 A | 3/1991 |
| SU | 663861 A1 | 5/1979 |

* cited by examiner

*Primary Examiner* — Gilbert Y Lee
(74) *Attorney, Agent, or Firm* — Kinney & Lange, P.A.

(57) ABSTRACT

A gas turbine engine includes a first rotor shaft and a second rotor shaft around the first rotor shaft. A knife edge seal is radially between the first rotor shaft and the second rotor shaft, and is connected to one of the first rotor shaft or the second rotor shaft. The knife edge seal is sized radially to form a gap between the knife edge seal and the other of the first rotor shaft or the second rotor shaft. A plurality of blades having a general airfoil shape is between the first rotor shaft and the second rotor shaft proximate the knife edge seal. The plurality of blades is connected to the first rotor shaft or the second rotor shaft, and a second gap is formed radially between the plurality of blades and the other of the first rotor shaft or the second rotor shaft.

20 Claims, 4 Drawing Sheets

INTERSHAFT BLADELET SEAL

STATEMENT OF GOVERNMENT INTEREST

This invention was made with government support under FA8626-16-C-2139 awarded by the United States Airforce. The government has certain rights in the invention.

BACKGROUND

The present disclosure relates to shaft seals for gas turbine engines, and more specifically to seals between a low rotor shaft and a high rotor shaft in a gas turbine engine.

Secondary flow systems in gas turbine engines direct cooling air to various locations in the gas turbine engine to keep engine components from overheating. In some gas turbine engines, the secondary flow system will direct cooling air across the high rotor shaft and into the low rotor shaft to deliver cooling air to the turbine section of the engine. In these gas turbine engines, seals are required between the high rotor shaft and the low rotor shaft to keep higher-pressure higher-temperature gases from leaking into the secondary flow systems.

Traditionally, knife edge seals have been used between the high rotor shaft and the low rotor shaft to reduce leakage. However, knife edge seals, to be affective at controlling leakage, require relatively small deflections between the low rotor shaft and the high rotor shaft. If deflections are relatively large between the low rotor shaft and the high rotor shaft, additional bearing assemblies within the gas turbine engine may be required, which increases the cost, complexity, and overall weight of the gas turbine engine.

SUMMARY

In one embodiment, a gas turbine engine includes a low rotor shaft and a high rotor shaft around the low rotor shaft. A knife edge seal is radially between the low rotor shaft and the high rotor shaft and is connected to the low rotor shaft. The knife edge seal is sized radially to form a gap between the knife edge seal and the high rotor shaft. A plurality of blades, each blade having a general airfoil shape, is between the low rotor shaft and the high rotor shaft proximate the knife edge seal. The plurality of blades is connected to the low rotor shaft or the high rotor shaft, and a second gap is formed radially between the plurality of blades and the other of the low rotor shaft or the high rotor shaft.

In another embodiment, a gas turbine engine includes a first rotor shaft and a second rotor shaft around the first rotor shaft. A knife edge seal is radially between the first rotor shaft and the second rotor shaft, and is connected to one of the first rotor shaft or the second rotor shaft. The knife edge seal is sized radially to form a gap between the knife edge seal and the other of the first rotor shaft or the second rotor shaft. A plurality of blades having a general airfoil shape is between the first rotor shaft and the second rotor shaft proximate the knife edge seal. The plurality of blades is connected to the first rotor shaft or the second rotor shaft, and a second gap is formed radially between the plurality of blades and the other of the first rotor shaft or the second rotor shaft.

In another embodiment, a gas turbine engine includes a low rotor shaft and a high rotor shaft around the low rotor shaft. A knife edge seal is radially between the low rotor shaft and the high rotor shaft, and is connected to the low rotor shaft. The knife edge seal is sized radially to form a gap between the knife edge seal and the high rotor shaft. A plurality of blades, each blade having a general airfoil shape, is between the low rotor shaft and the high rotor shaft proximate the knife edge seal, and is connected to the high rotor shaft. A second gap is formed radially between the plurality of blades and the low rotor shaft.

Persons of ordinary skill in the art will recognize that other aspects and embodiments are possible in view of the entirety of the present disclosure, including the accompanying figures.

While the above-identified drawing figures set forth one or more embodiments, other embodiments are also contemplated. It should be understood that numerous other modifications and embodiments can be devised by those skilled in the art, which fall within the scope and spirit of the principles of the claims. The figures may not be drawn to scale, and applications and embodiments may include features and components not specifically shown in the drawings. Like reference numerals identify similar structural elements.

DETAILED DESCRIPTION

The disclosure relates to an intershaft seal that includes a knife edge seal and a plurality of blades extending between two rotating shafts. Both the knife edge seal and the plurality of blades are sized radially to form gaps between the rotating shafts and the tips of the knife edge seal and the tips of the plurality of blades. The gaps between the rotating shafts and the blades and the knife edge seal provide sufficient space to allow deflection between the two rotating shafts without interference from the blades and the knife edge seal. The plurality of blades and the knife edge seal together minimize leakage between the rotating shafts to an acceptable level despite the gaps by creating turbulence and recirculation in the leakage flow between the two rotating shafts. The knife edge seal and the plurality of blades are described below with reference to FIGS. 1-4.

Figure 1:
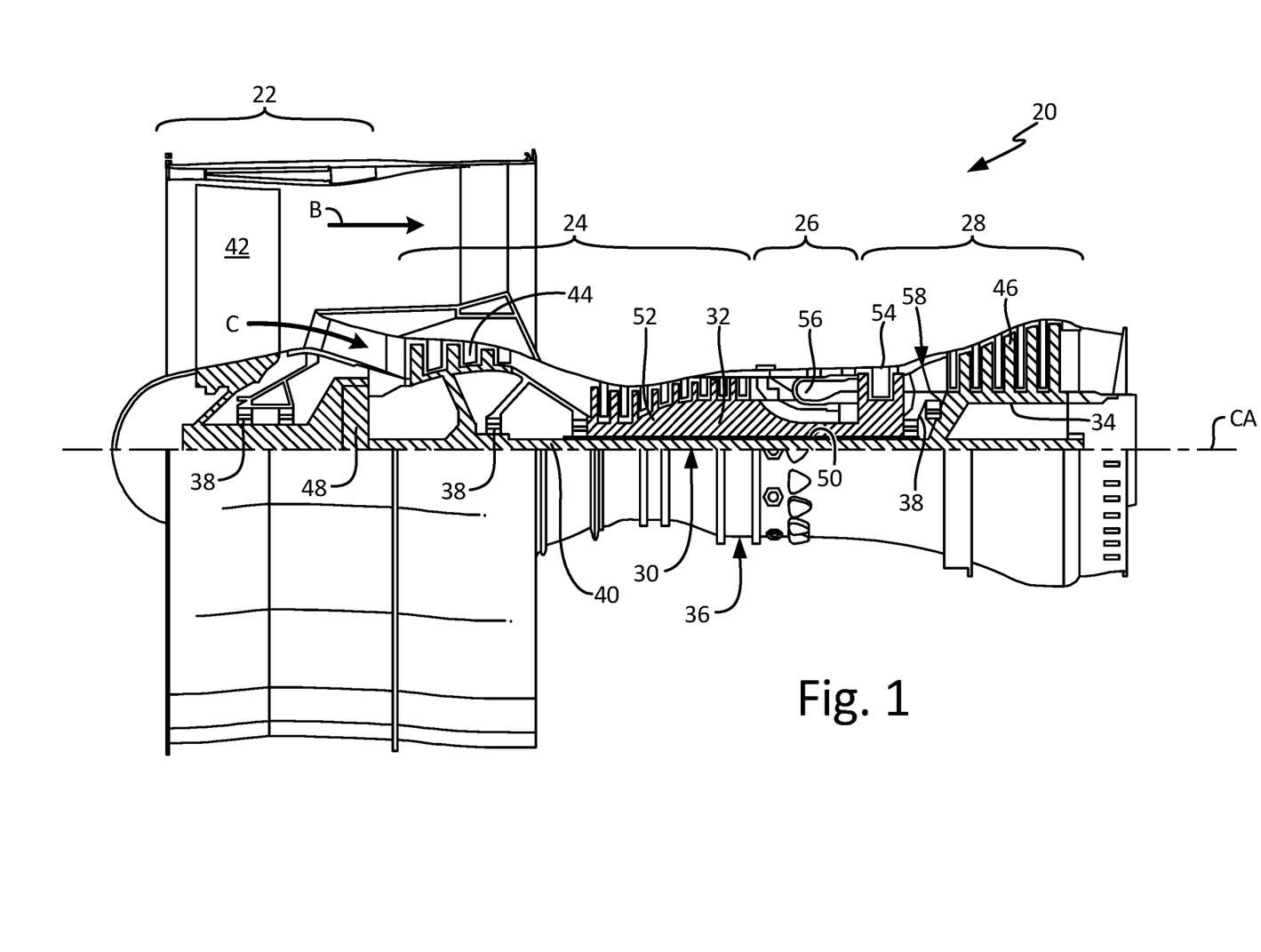
FIG. 1 is a partial cross-sectional view of a gas turbine engine.

FIG. 1 is a quarter-sectional view that schematically illustrates example gas turbine engine 20 that includes fan section 22, compressor section 24, combustor section 26 and turbine section 28. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes low speed spool 30 and high speed spool 32 mounted for rotation about center axis CA of gas turbine engine 20 relative to engine static structure 36 via several bearing assemblies 38. It should be understood that various bearing assemblies 38 at various locations may alternatively or additionally be provided.

Low speed spool 30 generally includes low rotor shaft 40 that connects fan 42 and low pressure (or first) compressor section 44 to low pressure (or first) turbine section 46. Low rotor shaft 40 drives fan 42 through a speed change device, such as geared architecture 48, to drive fan 42 at a lower speed than low speed spool 30. High-speed spool 32 includes high rotor shaft 50 that interconnects high pressure (or second) compressor section 52 and high pressure (or second) turbine section 54. High rotor shaft 50 is disposed around low rotor shaft 40, and low rotor shaft 40 and high rotor shaft 50 are concentric and rotate via bearing assemblies 38 about center axis CA.

Combustor 56 is arranged between high pressure compressor 52 and high pressure turbine 54. Mid-turbine frame 58 of engine static structure 36 can be arranged generally between high pressure turbine 54 and low pressure turbine 46. Mid-turbine frame 58 further supports bearing assemblies 38 in turbine section 28 as well as setting airflow entering the low pressure turbine 46. The core airflow C is compressed first by low pressure compressor 44 and then by high pressure compressor 52 mixed with fuel and ignited in combustor 56 to produce high speed exhaust gases that are then expanded through high pressure turbine 54, mid-turbine frame 58, and low pressure turbine 46. As discussed below with reference to FIGS. 2 and 3, cooling air flow CF is directed from compressor section 24 to the components of turbine section 28 via low rotor shaft 40, and seals are provided between low rotor shaft 40 and high rotor shaft 50 to reduce core airflow C from leaking between low rotor shaft 40 and high rotor shaft 50 into cooling air flow CF.

Figure 2:
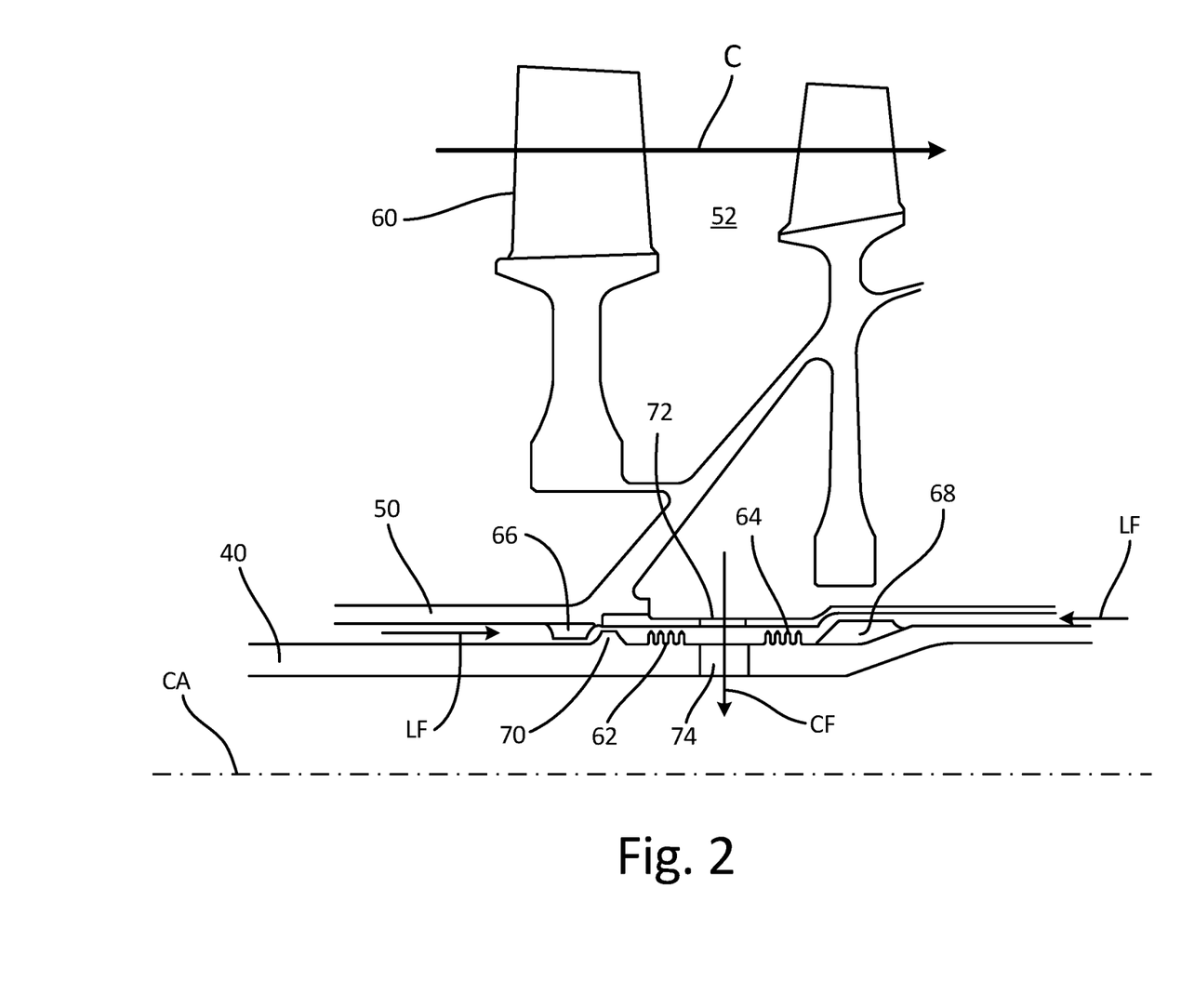
FIG. 2 is a cross-sectional view of a portion of a compressor section, low rotor shaft, and high rotor shaft of the gas turbine engine.
Figure 3:
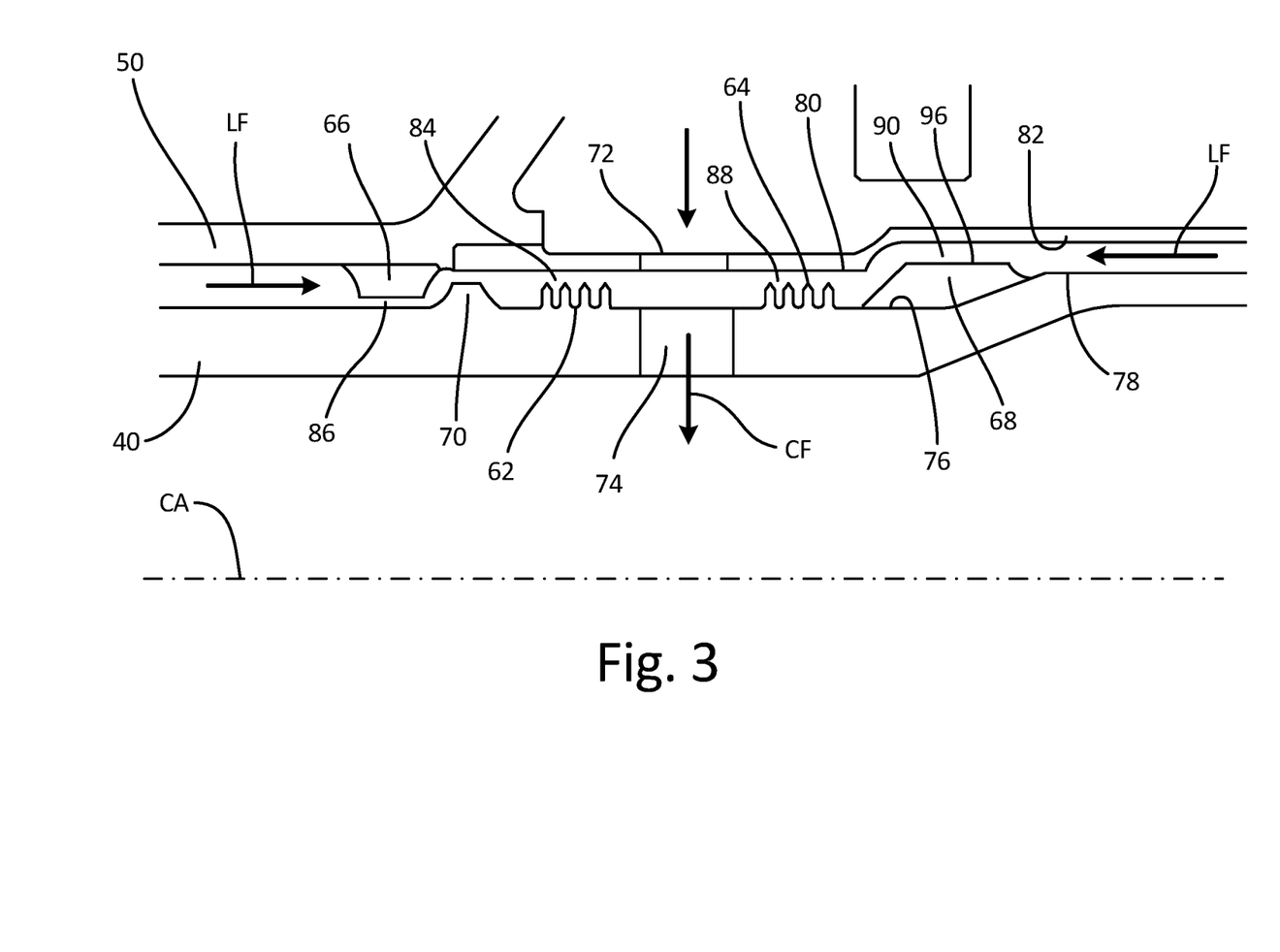
FIG. 3 is a cross-sectional view of a portion of a low rotor shaft, a high rotor shaft, a first knife edge seal, a second knife edge seal, a first plurality of blades, and a second plurality of blades.

FIGS. 2 and 3 will be discussed concurrently. FIG. 2 is a cross-sectional view of a portion of high pressure compressor section 52, low rotor shaft 40, and high rotor shaft 50 of gas turbine engine 20 (shown in FIG. 1). As shown in FIG. 2, gas turbine engine 20 further includes compressor blades 60, first knife edge seal 62, second knife edge seal 64, a first set or plurality of blades 66, a second set or plurality of blades 68, bump 70, first hole 72, and second hole 74. Cooling air flow CF is also shown in FIG. 2. FIG. 3 is an enlarged cross-sectional view of low rotor shaft 40, high rotor shaft 50, first knife edge seal 62, second knife edge seal 64, the first set of blades 66, and the second set of blades 68. As shown in FIG. 3, low rotor shaft 40 includes first outer surface 76 and second outer surface 78. High rotor shaft 50 includes first inner surface 80 and second inner surface 82. First gap 84, second gap 86, third gap 88, fourth gap 90, and leakage flow LF are also shown in FIG. 3.

High rotor shaft 50 is disposed around low rotor shaft 40 and center axis CA. Compressor blades 60 are connected to high rotor shaft 50 and are rotated by high rotor shaft 50. As discussed above with reference to FIG. 1, low rotor shaft 40 rotates inside high rotor shaft 50. Bearing assemblies 38 (shown in FIG. 1) radially space high rotor shaft 50 from low rotor shaft 40. As shown in FIGS. 2 and 3, first hole 72 is formed in high rotor shaft 50 and second hole 74 is formed in low rotor shaft 40. During operation of gas turbine engine 20, cooling air flow CF crosses high rotor shaft 50 via first hole 72 and enters low rotor shaft 40 via second hole 74. Leakage flow LF enters between high rotor shaft 50 and low rotor shaft 40 at various locations (not shown) forward and aft of first hole 72 and second hole 74. Cooling air flow CF generally has a lower pressure than leakage flow LF, thus, first knife edge seal 62, second knife edge seal 64, the first set of blades 66, and the second set of blades 68 are disposed radially between low rotor shaft 40 and high rotor shaft 50 to impede leakage flow LF from entering holes 72, 74 and contaminating cooling air flow CF.

First knife edge seal 62 is connected to low rotor shaft 40 and is positioned axially forward of first hole 72 and second hole 74 relative center axis CA of gas turbine engine 20. Second knife edge seal 64 is connected to low rotor shaft 40 and is positioned axially aft of first knife edge seal 62, first hole 72, and second hole 74 relative center axis CA of gas turbine engine 20. As shown in FIGS. 2 and 3, first knife edge seal 62 and second knife edge seal 64 both include a set of annular teeth that extend radially between low rotor shaft 40 and high rotor shaft 50. The first set of blades 66 is connected to high rotor shaft 50 and is positioned proximate first knife edge seal 62 and axially forward of first knife edge seal 62. The second set of blades 68 is connected to low rotor shaft 40 and is positioned proximate to second knife edge seal 64. As shown in FIGS. 2 and 3, the second set of blades 68 is positioned axially aft of second knife edge seal 64.

Shown best in FIG. 3, first knife edge seal 62 is sized radially to form first gap 84 between first knife edge seal 62 and high rotor shaft 50. Second gap 86 is formed radially between the first set of blades 66 and low rotor shaft 40. Second knife edge seal 64 is sized radially to form third gap 88 between second knife edge seal 64 and high rotor shaft 50. Fourth gap 90 is formed radially between the second set of blades 68 and high rotor shaft 50. As shown in FIG. 3, first knife edge seal 62 and second knife edge seal 64 have the same radial height, such that first gap 84 and third gap 88 are equal in size in the radial direction relative center axis CA of gas turbine engine 20. The first set of blades 66 and the second set of blades 68 can be sized in the radial direction such that second gap 86 and fourth gap 90 are equal in size in the radial direction to first gap 84 and third gap 88. During operation of gas turbine engine 20, first gap 84, second gap 86, third gap 88, and fourth gap 90 prevent first knife edge seal 62, the first set of blades 66, second knife edge seal 64, and the second set of blades 68 respectively from contacting both low rotor shaft 40 and high rotor shaft 50 during all operating conditions of gas turbine engine 20. Thus, first gap 84, second gap 86, third gap 88, and fourth gap 90 provide sufficient radial space for low rotor shaft 40 and high rotor shaft 50 to deflect relative one another without interference from first knife edge seal 62, the first set of blades 66, second knife edge seal 64, and the second set of blades 68.

Despite the presence of first gap 84, second gap 86, third gap 88, and fourth gap 90, leakage flow LF is impeded from entering first hole 72 and second hole 74, or reduced to an acceptable level, by the first set of blades 66 and the second set of blades 68. The first set of blades 66 and the second set of blades 68 impede leakage flow LF by radially turning leakage flow LF into low rotor shaft 40 or high rotor shaft 50. By radially turning leakage flow LF, the first set of blades 66 and the second set of blades 68 cause leakage flow LF to become turbulent and recirculate between low rotor shaft 40 and high rotor shaft 50. First knife edge seal 62 and second knife edge seal 64 further discourage the portions of leakage flow LF that manage to flow past blades 66, 68, thereby blocking leakage flow LF from first hole 72 and second hole 74, or reducing leakage flow LF sufficient enough to not overly interfere with cooling air flow CF.

Bump 70 is formed on low rotor shaft 40 and is positioned axially between the first set of blades 66 and first knife edge seal 62. Bump 60 can extend the entire circumference of low rotor shaft 40, or bump 60 can extend less than the full circumference of low rotor shaft 40. Bump 70 provides an additional obstacle between the first set of blades 66 and first knife edge seal 62 to further impede leakage flow LF across the first set of blades 66 and first knife edge seal 62. Bump 60 extends the same radial height as first knife edge seal 62, such that a gap is formed between bump 60 and high rotor shaft 50. Bump 60 can also be an assembly stop that keeps low rotor shaft 40 and high rotor shaft 50 aligned relative one another during the assembly process of gas turbine engine 20.

As shown best in FIG. 3, low rotor shaft 40 includes first outer surface 76 and second outer surface 78. Second outer surface 78 of low rotor shaft 40 is positioned aft of first outer surface 76 relative center axis CA. Second outer surface 78 is larger in diameter than first outer surface 76. The second set of blades 68 extend axially between first outer surface 76 and second outer surface 78 of low rotor shaft 40, such that second outer surface 78 steps-down to first outer surface 76 at the axial position of the second set of blades 68. Second inner surface 82 of high rotor shaft 50 is positioned aft of first inner surface 80. Second inner surface 82 is larger in diameter than first inner surface 80. The second set of blades 68 is positioned axially aft of first inner surface 80, such that second inner surface 82 steps down to first inner surface 80 immediately forward of the second set of blades 68. Each blade 68 of the second set of blades 68 includes a tip 96 that is positioned radially outward from first inner surface 80 relative center axis CA of gas turbine engine 20. Together, first outer surface 76, second outer surface 78, first inner surface 80, second inner surface 82, and the second set of blades 68 create a tortuous flow path aft of second knife edge seal 64 that further decreases leakage flow LF by increasing the turbulence of leakage flow LF aft of second knife edge seal 64. The shape of the first set of blades 66 and the second set of blades 68 are described below with reference to FIG. 4.

Figure 4:
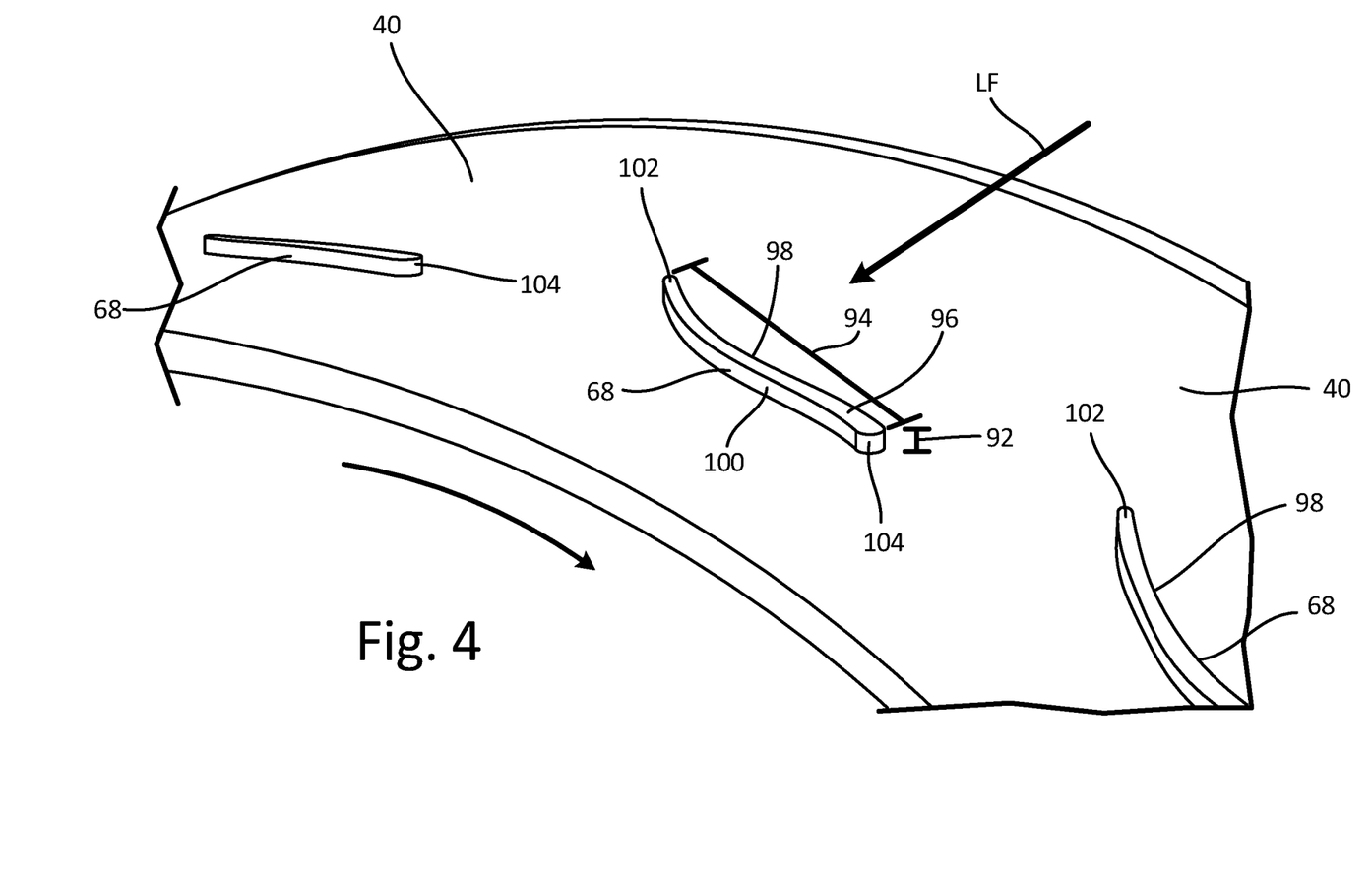
FIG. 4 is a perspective view of a plurality of blades on the low rotor shaft.

FIG. 4 is a perspective view of the second set of blades 68 on low rotor shaft 40. While the first set of blades 66 are not shown in FIG. 4, the first set of blades 66 can be similarly configured to the second set of blades 68 except rotated end-for-end and set on a concave surface. As shown in FIG. 4, each of blades 68 has a general airfoil shape that includes radial span 92, chord 94, tip 96, pressure surface 98, suction surface 100, leading edge 104, and trailing edge 102. Blades 68 are circumferentially spaced from one another on low rotor shaft 40. Pressure surface 98 of each blade 68 is positioned opposite suction surface 100. Both pressure surface 98 and suction surface 100 extend from leading edge 104 to trailing edge 102, and extend radially from low rotor shaft 40 to tip 96. Pressure surface 98 turns from the circumferential direction to the axial direction as pressure surface 98 extends from leading edge 104 to trailing edge 102. The turning of pressure surface 98 into the axial direction causes leakage flow LF to impede on pressure surface 98 and recirculate, thereby increasing the turbulence of leakage flow LF. As discussed above with reference to FIGS. 2 and 3, increasing the turbulence of leakage flow LF decreases the amount of leakage flow LF to flow past the second set of blades 68. Each of blades 68 includes chord 94 that is longer than radial span 92. Chord 94 is defined as the distance between leading edge 104 and trailing edge 102. Radial span 92 is defined as the radial distance between low rotor shaft 40 and tip 96. Radial span 92 of each of blades 68 is shorter than chord 94 due to the tight space requirements between low rotor shaft 40 and high rotor shaft 50.

In view of the foregoing description, it will be recognized that the present disclosure provides numerous advantages and benefits. For example, first knife edge seal 62, the first set of blades 66, second knife edge seal 64, and the second set of blades 68 reduce leakage flow LF into first hole 72 and second hole 74 sufficient enough to not overly interfere with cooling air flow CF. Furthermore, first gap 84, second gap 86, third gap 88, and fourth gap 90 provide sufficient radial space for low rotor shaft 40 and high rotor shaft 50 to deflect relative one another during all operating conditions without interference from first knife edge seal 62, the first set of blades 66, second knife edge seal 64, and the second set of blades 68. First knife edge seal 62, the first set of blades 66, second knife edge seal 64, and the second set of blades 68 are relatively simple to manufacture and add relatively little weight and cost to gas turbine engine 20

The following are non-exclusive descriptions of possible embodiments of the present invention.

In one embodiment, a gas turbine engine includes a low rotor shaft and a high rotor shaft around the low rotor shaft. A knife edge seal is radially between the low rotor shaft and the high rotor shaft and is connected to the low rotor shaft. The knife edge seal is sized radially to form a gap between the knife edge seal and the high rotor shaft. A plurality of blades, each blade having a general airfoil shape, is between the low rotor shaft and the high rotor shaft proximate the knife edge seal. The plurality of blades is connected to the low rotor shaft or the high rotor shaft, and a second gap is formed radially between the plurality of blades and the other of the low rotor shaft or the high rotor shaft.

The gas turbine engine of the preceding paragraph can optionally include, additionally and/or alternatively, any one or more of the following features, configurations and/or additional components:

the plurality of blades is connected to the high rotor shaft and is positioned axially forward of the knife edge seal relative a center axis of the gas turbine engine;

a second knife edge seal radially between the low rotor shaft and the high rotor shaft, wherein the second knife edge seal is connected to the low rotor shaft, wherein the second knife edge seal is sized radially to form a third gap between the second knife edge seal and the high rotor shaft, and wherein the second knife edge seal is positioned axially aft of the knife edge seal relative the center axis of the gas turbine engine;

a second plurality of blades having a general airfoil shape, wherein the second plurality of blades is between the low rotor shaft and the high rotor shaft and axially aft of the second knife edge seal, wherein the second plurality of blades is connected to the low rotor shaft or the high rotor shaft, and wherein a fourth gap is radially between the second plurality of blades and the other of the low rotor shaft or the high rotor shaft;

the second plurality of blades is connected to the low rotor shaft;

a first hole formed in the high rotor shaft and positioned axially between the knife edge seal and the second knife edge seal; and a second hole formed in the low rotor shaft and positioned axially between the knife edge seal and the second knife edge seal;

the gap between the knife edge seal and the high rotor shaft, the second gap between the plurality of blades and the low rotor shaft, the third gap between the second knife edge seal and the high rotor shaft, and the fourth gap between the second plurality of blades and the high rotor shaft are equal in size in a radial direction relative the center axis of the gas turbine engine;

a bump formed on the low rotor shaft and positioned axially between the plurality of blades and the knife edge seal;

each blade of the plurality of blades and each blade of the second plurality of blades comprises a chord and a radial span, wherein the chord is longer than the radial span;

the low rotor shaft comprises: a first outer surface; a second outer surface aft of the first outer surface, wherein the second outer surface is larger in diameter than the first outer surface, and wherein the second plurality of blades extend axially between the first outer surface and the second outer surface; and/or the high rotor shaft comprises: a first inner surface; and a second inner surface aft of the first inner surface, wherein the second inner surface is larger in diameter than the first inner surface, and wherein the second plurality of blades is positioned axially aft of the first inner surface, and wherein each of the second plurality of blades comprises a tip radially outward from the first inner surface relative the center axis of the gas turbine engine.

In another embodiment, a gas turbine engine includes a first rotor shaft and a second rotor shaft around the first rotor shaft. A knife edge seal is radially between the first rotor shaft and the second rotor shaft, and is connected to one of the first rotor shaft or the second rotor shaft. The knife edge seal is sized radially to form a gap between the knife edge seal and the other of the first rotor shaft or the second rotor shaft. A plurality of blades having a general airfoil shape is between the first rotor shaft and the second rotor shaft proximate the knife edge seal. The plurality of blades is connected to the first rotor shaft or the second rotor shaft, and a second gap is formed radially between the plurality of blades and the other of the first rotor shaft or the second rotor shaft.

The gas turbine engine of the preceding paragraph can optionally include, additionally and/or alternatively, any one or more of the following features, configurations and/or additional components:

the knife edge seal is connected to the first rotor shaft, and wherein the plurality of blades is connected to the second rotor shaft and is positioned axially forward of the knife edge seal relative a center axis of the gas turbine engine;

a second knife edge seal radially between the first rotor shaft and the second rotor shaft, wherein the second knife edge seal is connected to the first rotor shaft, wherein the second knife edge seal is sized radially to form a third gap between the second knife edge seal and the second rotor shaft, and wherein the second knife edge seal is positioned axially aft of the knife edge seal relative the center axis of the gas turbine engine; and/or a second plurality of blades having a general airfoil shape, wherein the second plurality of blades is between the first rotor shaft and the second rotor shaft and axially aft of the second knife edge seal, wherein the second plurality of blades is connected to the first rotor shaft, and wherein a fourth gap is formed radially between the second plurality of blades and the second rotor shaft.

In another embodiment, a gas turbine engine includes a low rotor shaft and a high rotor shaft around the low rotor shaft. A knife edge seal is radially between the low rotor shaft and the high rotor shaft, and is connected to the low rotor shaft. The knife edge seal is sized radially to form a gap between the knife edge seal and the high rotor shaft. A plurality of blades, each blade having a general airfoil shape, is between the low rotor shaft and the high rotor shaft proximate the knife edge seal, and is connected to the high rotor shaft. A second gap is formed radially between the plurality of blades and the low rotor shaft.

The gas turbine engine of the preceding paragraph can optionally include, additionally and/or alternatively, any one or more of the following features, configurations and/or additional components:

the plurality of blades is axially forward of the knife edge seal relative a center axis of the gas turbine engine;

a second knife edge seal radially between the low rotor shaft and the high rotor shaft, wherein the second knife edge seal is connected to the low rotor shaft, wherein the second knife edge seal is sized radially to form a third gap between the second knife edge seal and the high rotor shaft, and wherein the second knife edge seal is positioned axially aft of the knife edge seal relative the center axis of the gas turbine engine; and a second plurality of blades having a general airfoil shape, wherein the second plurality of blades is between the low rotor shaft and the high rotor shaft and axially aft of the second knife edge seal, wherein the second plurality of blades is connected to the low rotor shaft, and wherein a fourth gap is formed radially between the second plurality of blades and the high rotor shaft;

the plurality of blades is circumferentially spaced from one another on the high rotor shaft, and wherein each of the plurality of blades comprises a pressure surface opposite a suction surface, wherein the pressure surface turns from a circumferential direction to an axial direction as the pressure surface extends from a leading edge to a trailing edge, and wherein each of the plurality of blades comprises a chord and a radial span, the chord being longer than the radial span; and/or the second plurality of blades is circumferentially spaced from one another on the low rotor shaft, and wherein each of the plurality of blades comprises a pressure surface opposite a suction surface, wherein the pressure surface turns from a circumferential direction to an axial direction as the pressure surface extends from a leading edge to a trailing edge, and wherein each of the second plurality of blades comprises a chord and a radial span, the chord being longer than the radial span.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while FIGS. 2 and 3 show the first set of blades 66 as being formed on the high rotor shaft 50, the first set of blades 66 can be formed on low rotor shaft 40. Similarly, the second set of blades 68 and knife edge seals 62, 64 can be formed on high rotor shaft 50 instead of low rotor shaft 40. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprises:
    a low rotor shaft;
    a high rotor shaft around the low rotor shaft, wherein the high rotor shaft and the low rotor shaft are concentric;
    a knife edge seal radially between the low rotor shaft and the high rotor shaft, wherein the knife edge seal is connected to the low rotor shaft and sized radially to form a gap between the knife edge seal and the high rotor shaft; and
    a plurality of blades with each blade having a general airfoil shape, wherein the plurality of blades is between the low rotor shaft and the high rotor shaft proximate the knife edge seal, wherein the plurality of blades is connected to the low rotor shaft or the high rotor shaft, and wherein a second gap is radially between the plurality of blades and the other of the low rotor shaft or the high rotor shaft.

2. The gas turbine engine of claim 1, wherein the plurality of blades is connected to the high rotor shaft and is positioned axially forward of the knife edge seal relative a center axis of the gas turbine engine.

3. The gas turbine engine of claim 2 further comprising:
    a second knife edge seal radially between the low rotor shaft and the high rotor shaft, wherein the second knife edge seal is connected to the low rotor shaft, wherein the second knife edge seal is sized radially to form a third gap between the second knife edge seal and the high rotor shaft, and wherein the second knife edge seal is positioned axially aft of the knife edge seal relative the center axis of the gas turbine engine.

4. The gas turbine engine of claim 3 further comprising:
    a second plurality of blades having a general airfoil shape, wherein the second plurality of blades is between the low rotor shaft and the high rotor shaft and axially aft of the second knife edge seal, wherein the second plurality of blades is connected to the low rotor shaft or the high rotor shaft, and wherein a fourth gap is radially between the second plurality of blades and the other of the low rotor shaft or the high rotor shaft.

5. The gas turbine engine of claim 4, wherein the second plurality of blades is connected to the low rotor shaft.

6. The gas turbine engine of claim 5 further comprising:
    a first hole formed in the high rotor shaft and positioned axially between the knife edge seal and the second knife edge seal; and
    a second hole formed in the low rotor shaft and positioned axially between the knife edge seal and the second knife edge seal.

7. The gas turbine engine of claim 5, wherein the gap between the knife edge seal and the high rotor shaft, the second gap between the plurality of blades and the low rotor shaft, the third gap between the second knife edge seal and the high rotor shaft, and the fourth gap between the second plurality of blades and the high rotor shaft are equal in size in a radial direction relative the center axis of the gas turbine engine.

8. The gas turbine engine of claim 5 further comprising:
    a bump formed on the low rotor shaft and positioned axially between the plurality of blades and the knife edge seal.

9. The gas turbine engine of claim 5, wherein each blade of the plurality of blades and each blade of the second plurality of blades comprises a chord and a radial span, wherein the chord is longer than the radial span.

10. The gas turbine engine of claim 5, wherein the low rotor shaft comprises:
    a first outer surface; and
    a second outer surface aft of the first outer surface, wherein the second outer surface is larger in diameter than the first outer surface, and
    wherein the second plurality of blades extend axially between the first outer surface and the second outer surface.

11. The gas turbine engine of claim 10, wherein the high rotor shaft comprises:
    a first inner surface;
    a second inner surface aft of the first inner surface, wherein the second inner surface is larger in diameter than the first inner surface, and
    wherein the second plurality of blades is positioned axially aft of the first inner surface, and wherein each of the second plurality of blades comprises a tip radially outward from the first inner surface relative the center axis of the gas turbine engine.

12. A gas turbine engine comprises:
    a first rotor shaft;
    a second rotor shaft around the first rotor shaft;
    a second rotor shaft around the first rotor shaft, wherein the second rotor shaft and the first rotor shaft are concentric;
    a knife edge seal radially between the first rotor shaft and the second rotor shaft, wherein the knife edge seal is connected to one of the first rotor shaft or the second rotor shaft, and wherein the knife edge seal is sized radially to form a gap between the knife edge seal and the other of the first rotor shaft or the second rotor shaft; and
    a plurality of blades having a general airfoil shape, wherein the plurality of blades is between the first rotor shaft and the second rotor shaft proximate the knife edge seal, wherein the plurality of blades is connected to the first rotor shaft or the second rotor shaft, and wherein a second gap is formed radially between the plurality of blades and the other of the first rotor shaft or the second rotor shaft.

13. The gas turbine engine of claim 12, wherein the knife edge seal is connected to the first rotor shaft, and wherein the plurality of blades is connected to the second rotor shaft and is positioned axially forward of the knife edge seal relative a center axis of the gas turbine engine.

14. The gas turbine engine of claim 13 further comprising:
    a second knife edge seal radially between the first rotor shaft and the second rotor shaft, wherein the second knife edge seal is connected to the first rotor shaft, wherein the second knife edge seal is sized radially to form a third gap between the second knife edge seal and the second rotor shaft, and wherein the second knife edge seal is positioned axially aft of the knife edge seal relative the center axis of the gas turbine engine.

15. The gas turbine engine of claim 14 further comprising:
a second plurality of blades having a general airfoil shape, wherein the second plurality of blades is between the first rotor shaft and the second rotor shaft and axially aft of the second knife edge seal, wherein the second plurality of blades is connected to the first rotor shaft, and wherein a fourth gap is formed radially between the second plurality of blades and the second rotor shaft.

16. A gas turbine engine comprises:
a low rotor shaft;
a high rotor shaft around the low rotor shaft;
a knife edge seal radially between the low rotor shaft and the high rotor shaft, wherein the knife edge seal is connected to the low rotor shaft and sized radially to form a gap between the knife edge seal and the high rotor shaft; and
a plurality of blades with each blade having a general airfoil shape, wherein the plurality of blades is between the low rotor shaft and the high rotor shaft proximate the knife edge seal, wherein the plurality of blades is connected to the high rotor shaft, and wherein a second gap is formed radially between the plurality of blades and the low rotor shaft.

17. The gas turbine engine of claim 16, wherein the plurality of blades is axially forward of the knife edge seal relative a center axis of the gas turbine engine.

18. The gas turbine engine of claim 17 further comprising:
a second knife edge seal radially between the low rotor shaft and the high rotor shaft, wherein the second knife edge seal is connected to the low rotor shaft, wherein the second knife edge seal is sized radially to form a third gap between the second knife edge seal and the high rotor shaft, and wherein the second knife edge seal is positioned axially aft of the knife edge seal relative the center axis of the gas turbine engine; and
a second plurality of blades having a general airfoil shape, wherein the second plurality of blades is between the low rotor shaft and the high rotor shaft and axially aft of the second knife edge seal, wherein the second plurality of blades is connected to the low rotor shaft, and wherein a fourth gap is formed radially between the second plurality of blades and the high rotor shaft.

19. The gas turbine engine of claim 18, wherein the plurality of blades is circumferentially spaced from one another on the high rotor shaft, and wherein each of the plurality of blades comprises a pressure surface opposite a suction surface, wherein the pressure surface turns from a circumferential direction to an axial direction as the pressure surface extends from a leading edge to a trailing edge, and wherein each of the plurality of blades comprises a chord and a radial span, the chord being longer than the radial span.

20. The gas turbine engine of claim 19, wherein the second plurality of blades is circumferentially spaced from one another on the low rotor shaft, and wherein each of the second plurality of blades comprises a pressure surface opposite a suction surface, wherein the pressure surface turns from a circumferential direction to an axial direction as the pressure surface extends from a leading edge to a trailing edge, and wherein each of the second plurality of blades comprises a chord and a radial span, the chord being longer than the radial span.

* * * * *